(12) United States Patent
Katayama et al.

(10) Patent No.: US 6,507,783 B2
(45) Date of Patent: Jan. 14, 2003

(54) MOBILE NAVIGATION SYSTEM

(75) Inventors: Mutsumi Katayama, Saitama (JP); Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/941,716

(22) Filed: Aug. 30, 2001

(65) Prior Publication Data

US 2002/0032520 A1 Mar. 14, 2002

(30) Foreign Application Priority Data

Aug. 30, 2000  (JP) ........................................ 2000-260504

(51) Int. Cl.$^7$ .............................................. G01C 21/30
(52) U.S. Cl. ...................... 701/208; 701/207; 701/211; 340/995; 342/357.13
(58) Field of Search ................................. 701/200, 207, 701/208, 209, 211, 213; 340/988, 990, 995; 73/178 R; 342/357.01, 357.06, 357.13

(56) References Cited

U.S. PATENT DOCUMENTS 5,031,104 A  *  7/1991  Ikeda et al. .................. 340/990
6,088,652 A  *  7/2000  Abe ............................ 340/995
6,125,326 A  *  9/2000  Ohmura et al. ............. 342/457
6,434,482 B1 *  8/2002  Oshida et al. .............. 701/209

FOREIGN PATENT DOCUMENTS

JP           A783684           3/1995

* cited by examiner

*Primary Examiner*—Jacques H. Louis-Jacques
(74) *Attorney, Agent, or Firm*—Birch, Stewart, Kolasch & Birch, LLP (57) ABSTRACT

A mobile navigation system includes display map information generator to generate display map information based on the present position information of a mobile vehicle, reads, from a map information storing device, the map information of the near region at the external side of the region indicated with the display map information for each movement of the mobile vehicle of only the predetermined distance, and generates and stores the map information in the far region extending along the moving route of the mobile vehicle. The mobile navigation system can store the desired map information without any limitation on the capacity of memory and quickly display the necessary map information.

16 Claims, 12 Drawing Sheets

MOBILE NAVIGATION SYSTEM

This nonprovisional application claims priority under 35 U.S.C. § 119(a) on Patent Application No. 2000-260504 filed in Japan on Aug. 30, 2000, which is herein incorporated by reference.

BACKGROUND OF THE INVENTION

1. Field of the Invention

The present invention relates to a mobile navigation system for displaying map information and the present position information.

2. Description of the Background Art

As a mobile navigation apparatus for displaying a map information and the present position information, the apparatus disclosed in Japanese Published Unexamined Patent Application No. 83684/1995 is well known. This apparatus extracts the map information including the scheduled region for movement before starting the movement from a map information storing medium such as a CD-ROM or the like, stores the extracted map information into a memory such as an IC card or the like, loads only the memory into the mobile navigation apparatus at the time of starting the movement and displays the desired map information by reading this map information from the memory depending on the movement.

However, the mobile navigation apparatus of the related art has been requested, when the amount of map information to be extracted is larger than the capacity of the memory on the occasion of extracting the map information from a map information storing medium, to reduce the amount of the map information to less than the capacity of the memory by deleting a part of the area to be extracted by a user or selecting a map drawn on the smaller scale. Therefore, such a disadvantage as extracting the map information including the desired information has also been generated. The apparatus of the related art also has a disadvantage that the desired map information cannot be displayed when the target destination is changed during the movement. In addition, even if it has been possible to extract the map information from the map information storing medium during the movement, it is requested to delete the map information already stored when the amount of map information to be extracted newly is larger than the capacity of memory and therefore it has been difficult in some cases to store the record of movement.

SUMMARY OF THE INVENTION

The present invention has been proposed considering the background explained above and the object of the present invention is to provide a mobile navigation system which can store the desired map information without any limitation on the capacity of the memory, quickly display the desired map information and store the record of movement.

The mobile navigation system of the present invention includes a present position information generating means for detecting the current position of a mobile means to generate present position information, a map information storing means for storing map information, a map information generating means for reading the map information of the predetermined region from the map information storing means based on the present position information to generate a display map information from the map information obtained and a display means for displaying the display map information and the present position information, a moving distance calculating means for calculating a moving distance of the mobile means based on the present position information and the display map information generating means includes a near region map information reading means for reading out, from the map information storing means, the map information of the near region of the region indicated with the display map information every time the mobile means moves for only the predetermined distance and a far region map information storing means for generating the map information in the far region extending along the moving route in which the mobile means has moved from the near region map information and storing such information as the readout map information.

According to the present invention, since the map information of the near region at the external side of the region indicated with the display map information is read for each movement of the predetermined distance of a mobile means from the map information storing means, the map information of the desired region can be stored and displayed. Since the map information obtained is previously stored for each movement of the predetermined distance of the mobile means, the map information can be displayed quickly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
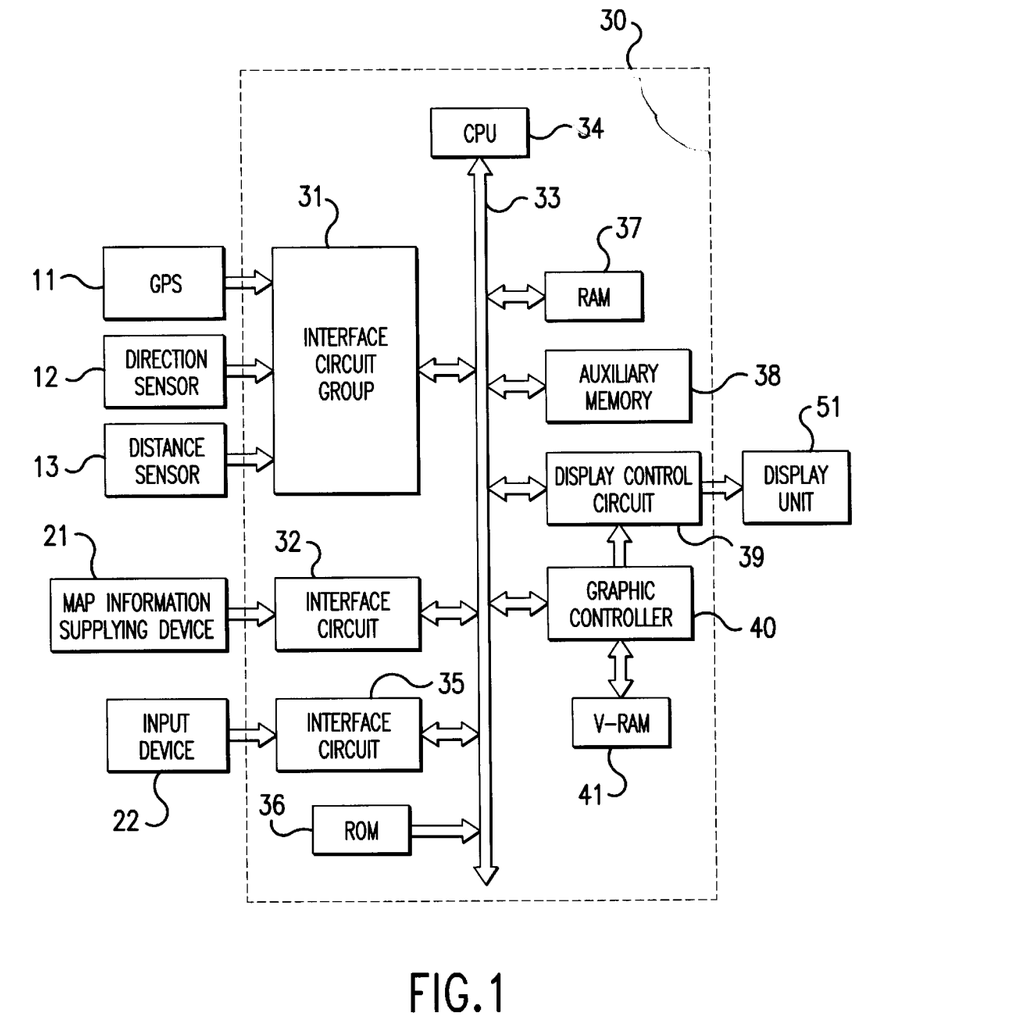
FIG. 1 is a block diagram illustrating the mobile navigation system of the present invention.

A preferred embodiment of the present invention will be explained below with reference to the accompanying drawings. A structure of the mobile navigation system of the present invention is illustrated in FIG. 1. A GPS (Global Positioning System) apparatus 11 is provided to detect the present position of the mobile means from the latitude and longitude. A direction sensor 12, for example, a terrestrial magnetism sensor, yaw rate sensor and gyro sensor or the like, is provided to detect the bearing of the mobile means. The output signals generated from these sensors 11 and apparatus 12 are supplied to an interface circuit group 31.

When the mobile means is a vehicle, it is also allowed to detect the output signal generated from a distance sensor 13. The moving distance of the vehicle can be obtained by detecting the value indicated with the output signal generated from the distance sensor 13 as the value representing the moving distance of vehicle. For example, a value obtained by counting up the number of times of rotations of a wheel is defined as the moving distance of the vehicle. The GPS apparatus 11 explained above is connected with a GPS antenna, not illustrated, for receiving the radio wave generated from a satellite.

The map information supplying device 21 is a server storing the map information, for example, a server for providing map information on the Internet. The map information stored in this server is supplied to a communication interface circuit 32 for making communication with the server via, for example, the telephone line and local area network (LAN).

The interface circuit group 31 and interface circuit 32 are connected to the input/output bus 33 of a controller 30. The input/output bus 33 is provided to input/output a data signal or address signal to/from a central processing unit (CPU). The output information from the sensors 11 to 13 and map information from the map information supplying device 21 are read out depending on an instruction from the CPU 34 generated in the predetermined timing and is then supplied to the input/output bus 33.

The input device 22 is connected to the interface circuit 35 and this interface circuit 35 is then connected to the input/output bus 33. Various instructions generated from the input device 22 depending on the input operations of a user are supplied to the CPU 34 via the interface circuit 35. The input device 22 is composed of a keyboard including a decide key, not illustrated, for determining the items displayed on the display unit 51 explained later and a select key, not illustrated, for designating the bearing on the map displayed on the display unit 51 or the like. The input device 22 may include a pointing device such as a mouse or the like to designate the position of map displayed on the display unit 51.

The input/output bus 33 is also connected with a ROM (Read Only Memory) 36 and a RAM (Random Access Memory) 37. The ROM 36 stores a program for displaying the map information on the display unit 51 and a program for generating the far region map information explained later. Meanwhile, the RAM 37 stores the map information of the predetermined region displayed on the display unit 51 and variables used in the programs to be executed. This RAM 37 is composed of a memory, for example, a nonvolatile memory of which content is never deleted even when the supply of power is disconnected. It is also possible to form a structure that an auxiliary memory 38 is connected to the input/output bus 33 as illustrated in FIG. 1. This auxiliary memory 38 is composed, for example, of an IC card consisting of a nonvolatile memory, a memory of large capacity such as a hard disk drive or the like and an interface circuit, not illustrated, of these elements and therefore can store the large amount of information which cannot be accommodated in the RAM 37.

In addition, the input/output bus 33 is also connected with a display control circuit 39 and a graphic controller 40. The display control circuit 39 is also connected with the display unit 51, while the graphic controller 40 is connected with a V-RAM 41 for storing the video information which may be displayed. The graphic controller 40 writes data to the V-RAM or read data therefrom depending on the instructions from the CPU 34. The display control circuit 39 controls the display unit 51 depending on the video information outputted from the graphic controller 40.

Figure 2:
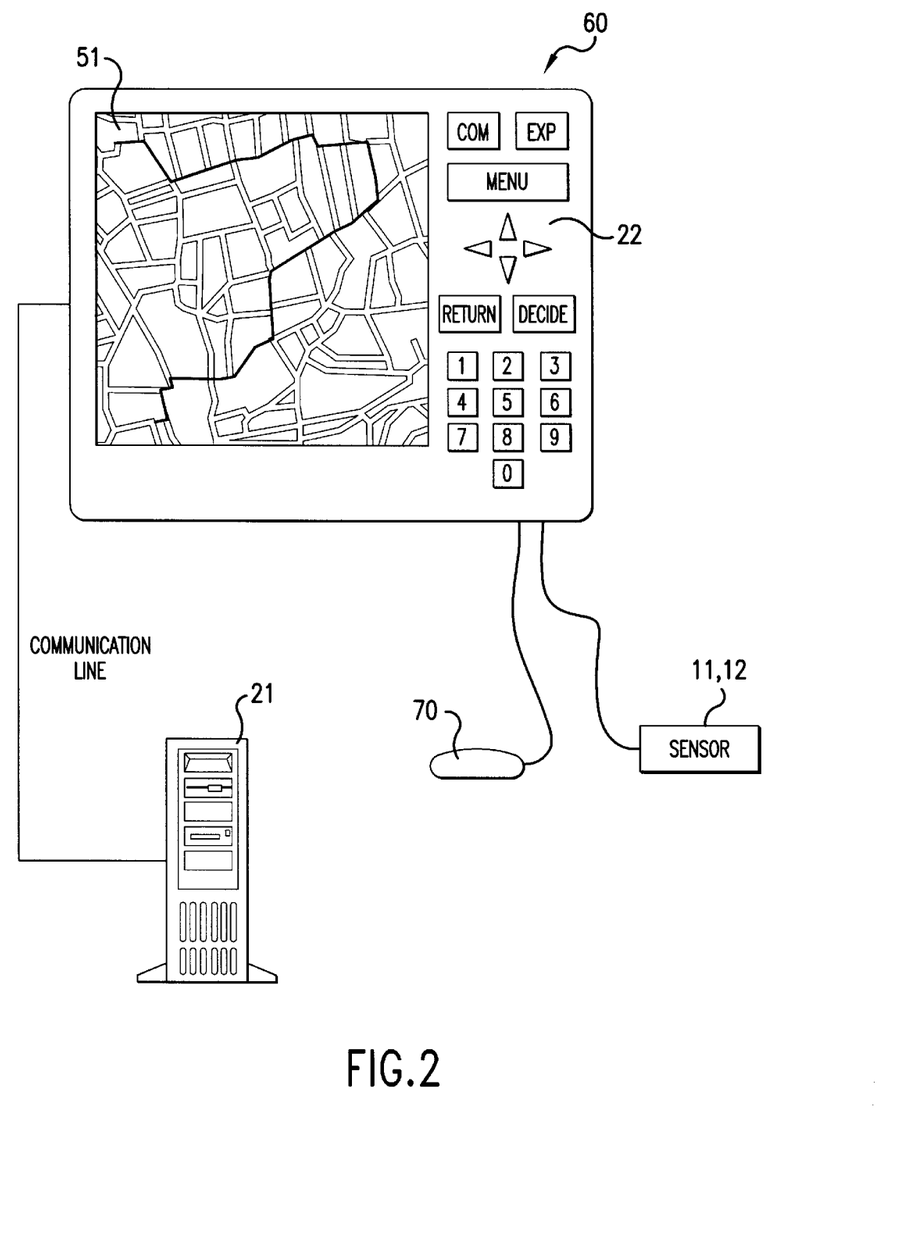
FIG. 2 is a schematic diagram illustrating the first embodiment of the present invention.

A structure of the mobile navigation system as a preferred embodiment of the present invention will be illustrated in FIG. 2. The display input unit 60 is composed of the display unit 51 and the input device 22. The display unit 51 displays a sign, for example, a pentagon sign indicating the present position, map information and a moving route. The input device 22 comprises the "EXP" key and "COM" key for expanding or compressing the image to be displayed on the display unit 51, "MENU" key for displaying the menu on the display unit 51, triangular selection keys for selecting the process from the menu displayed, "DECIDE" key for selecting whether the selected process shall be executed or not and "RETURN" key.

If a user is requested to set a value, the previously stored value is once displayed on the display unit 51 and the displayed value is reduced or increased by operating the select key explained above for the setting. When key arrangement of the input device 22 still leaves extra region for layout of the other keys, it is also possible to provide a ten-key numeric keypad as illustrated in FIG. 2 to realize direct input of a value from the ten-key numeric keypad.

The display input unit 60 is connected with the GPS antenna 70 using an antenna cable and is also connected with various sensors 11 to 13 such as GPS or the like with connecting cables. The display input unit 60 is connected with the map information supplying device 21, for example, the server for providing the map information on the Internet via the communication line, for example, the mobile telephone network.

In the embodiment explained above, the present position information generating means is composed of GPS 11 and direction sensor 12, the map information storing means is composed of the map information supplying device 21, the display map information generating means is composed of the CPU 34, ROM 36, RAM 37, V-RAM 41 and input/output bus 33, the moving distance calculating means and near region map information reading means are composed of the CPU 34, ROM 36, RAM 37 and input/output bus 33, the far region map information storing means is composed of the auxiliary memory 38 and the display means is composed of the display control circuit 39 and display unit 51.

In the following explanation, it is assumed that the mobile navigation system is activated and in the steady condition after completing the starting process such as the initialization of variables used in the CPU 34 or the like. It is also assumed that both near region map information far region map information are already stored in the auxiliary memory 38.

Figure 3:
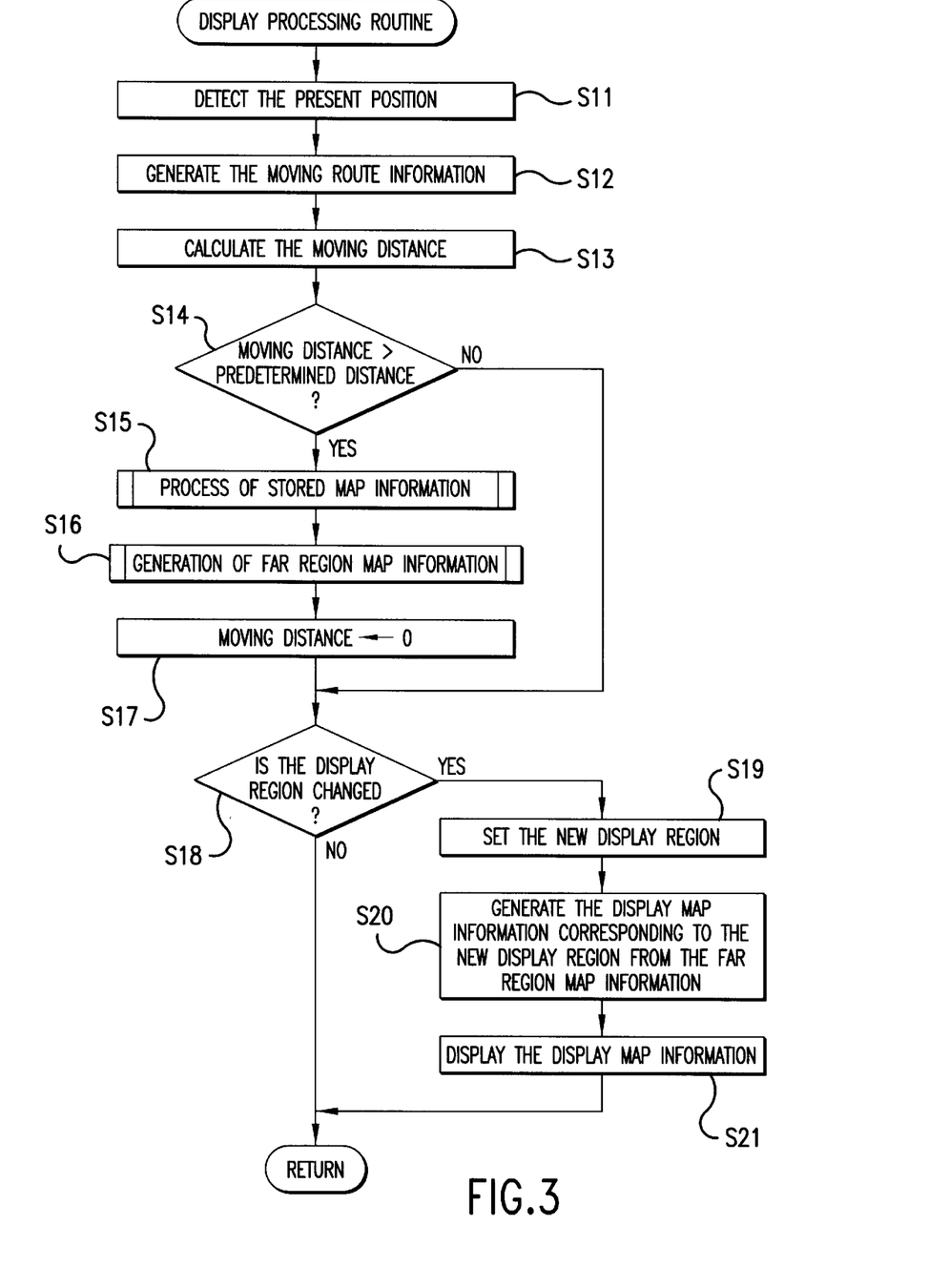
FIG. 3 is a flowchart indicating the subroutine for displaying the map information on the display unit.

A subroutine for displaying the map information on the display unit is illustrated in FIG. 3. This subroutine is called in the predetermined timing from the main routine, not illustrated, of the mobile navigation system and is then executed.

First, the present position of the mobile means is detected from the GPS apparatus 11 and direction sensor 12 (step S11). Next, the information of the moving route of the mobile mans is generated from the obtained current position information (step S12). This moving route information indicates the moving record of the mobile means. Next, the moving distance of mobile means is calculated from the generated moving route information (step S13). This moving distance indicates, as indicated later in the steps S16 and S17, the distance up to the present position from the point where the preceding far region map information is generated.

Next, whether the moving distance is longer than the predetermined distance or not is determined (step S14). This predetermined distance is determined depending on the scale of the map information displayed, moving speed of the mobile means and size of the display area of the display unit. In the step S14, when the moving distance is determined to be shorter than the predetermined distance, the process goes to the step S18 explained later. If the moving distance is determined to be longer than the predetermined distance, the subroutine for executing the process to reduce the far region of the far region map information stored in the auxiliary memory 38 explained later is called and executed (step S15) and the subroutine for generating the near region map information explained later is executed (step S16). Next, the moving distance explained above is set to the initial value, for example, to 0 (step S17).

Thereafter, whether the display region of the map information to be displayed on the display unit should be changed or not is determined (step S18). This determination is made, for example, depending on the fact that the length between the present position of the mobile means at the display area of the display unit and the external edge of the display area on the display unit has become shorter than the predetermined length or not. On the occasion of this determination, the moving speed of the mobile means may be included as the factor. When it is determined that the display region is changed, the display region to be displayed newly is determined (step S19) from the scale of the map information to be displayed and lateral length and vertical length of the display area of the display unit, the display map information is generated by reading the map information corresponding to the region to be newly displayed from the far region map information generated in the step S16 explained above (step S20) and this display map information is displayed in the display area of the display unit (step S21) to complete this subroutine. If it is determined that the display region is not changed in the step S18, this subroutine is immediately completed.

Figure 4:
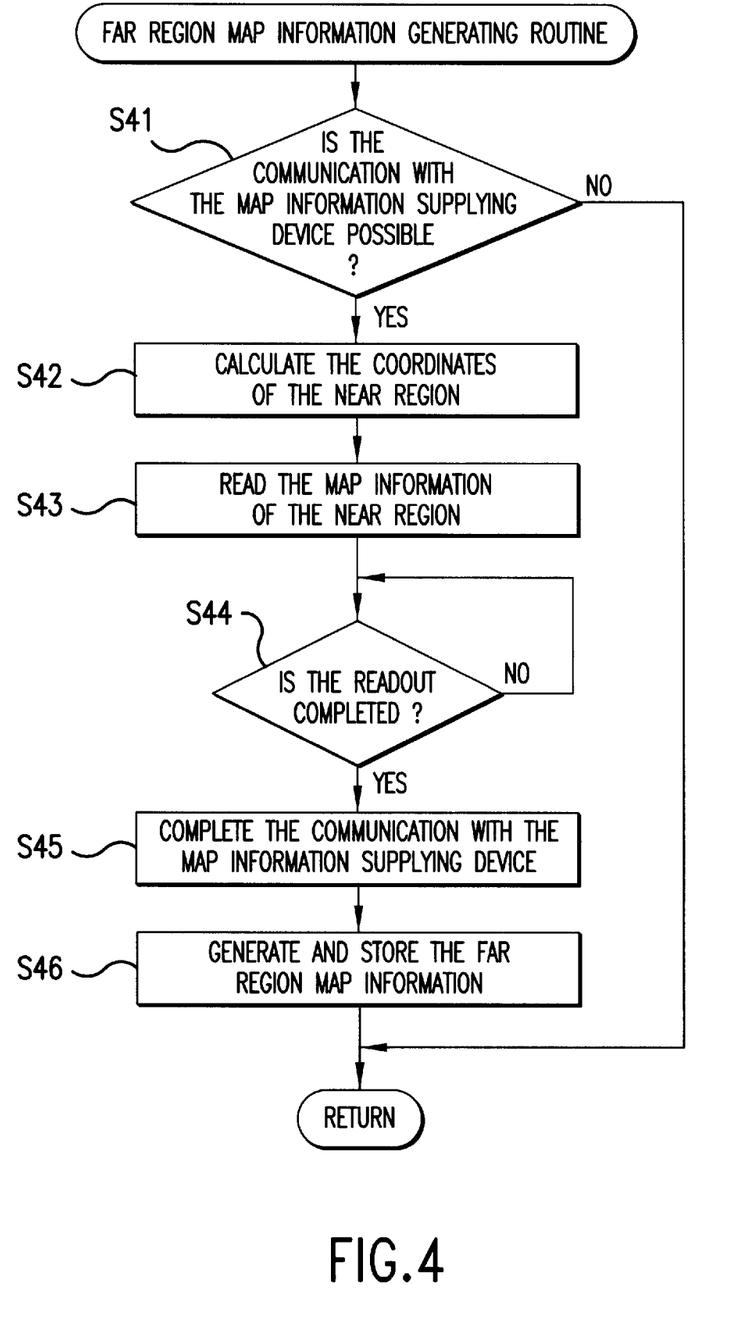
FIG. 4 is a flowchart indicating the subroutine for generating the far region map information to be called and executed in the step S16 of subroutine of FIG. 3.

FIG. 4 illustrates the subroutine for generating the far region map information to be called and executed in the step S16 explained above. First, it is determined whether the map information supplying device 21, for example, the server for providing the map information on the Internet and the map information displaying unit 60 are connected for making the communication or not (step S41). When it is determined that the communication is impossible, this subroutine is immediately terminated. Meanwhile, it is determined that communication with the map information supplying device is possible, the coordinate of the region near the region indicated with the map information displayed at present on the display unit is calculated based on the moving route information generated in the step S12 explained above (step S42). The coordinate of this near region indicates the position and size of the near region and can be calculated based on the scale of the map information to be displayed, lateral and vertical length of the display area of the display unit and velocity of the mobile means. Next, the map information corresponding to the near region (hereinafter, referred to as the near region map information) is read from the map information supplying device depending on the calculated coordinate of the near region (step S43).

Next, it is determined whether the reading of the near region map information is completed or not (step S44). When reading is determined to be not completed, the process returns to the step S43 to continue the reading process. Meanwhile, when the reading is determined to be completed, the communication with the map information supplying device is terminated (step S45), the far region map information is generated from the near region map information obtained (step S46) and thereafter this subroutine is terminated.

Figure 5:
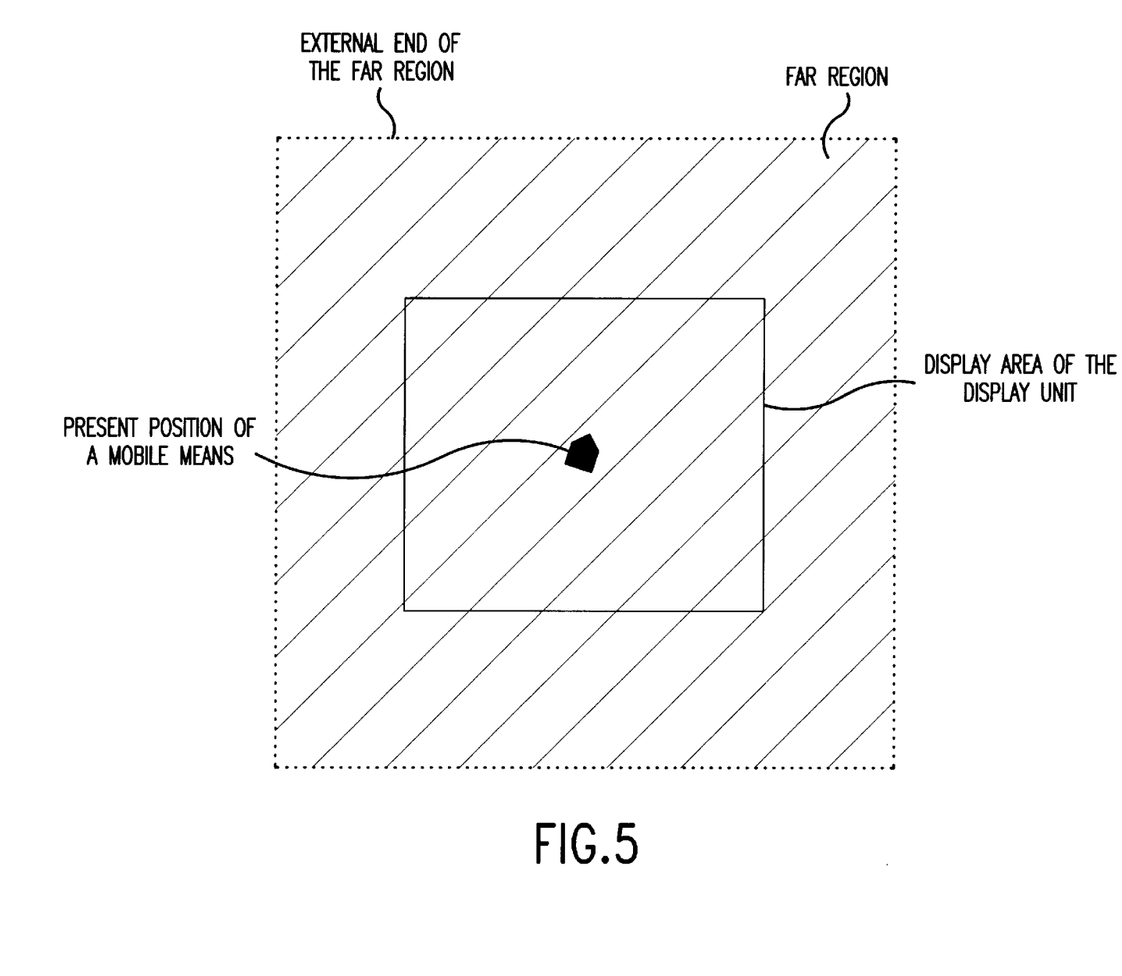
FIG. 5 is a schematic diagram illustrating the far region map information generated by reading the map information of the predetermined region from the map information supplying device when the mobile navigation system is activated.

The far region map information generated by executing the subroutine of FIG. 4 explained above will be illustrated in FIG. 5 to FIG. 7. FIG. 5 illustrates the far region map information when the mobile means is located at the start position. A square depicted with a thick black line indicates the external edge of the display area of the display unit. The map information in the internal region of the thick black square is displayed on the display area as the display map information. The black pentagon in the figure is a sign indicating the present position of the mobile means. The square of dotted line indicates the external edge of the far region and the map information of the region surrounded with the square of the dotted line is stored in the auxiliary memory as the far region map information. If the map information is not yet stored in the auxiliary memory when the mobile navigation system is activated, the map information of the predetermined region in the periphery of the present position of the mobile means is read from the map information supplying device based on the present position information as illustrated in FIG. 5, and this map information is stored as the far region map information as the preparation for starting the movement of the mobile means.

As illustrated in FIG. 5, the map information wider than that displayed on the display unit is previously read from the map information supplying device and this map information is stored in the auxiliary memory. Thereby, even when the moving direction of the mobile means is changed suddenly, the map information of the region to be displayed can be displayed quickly.

Figure 6:
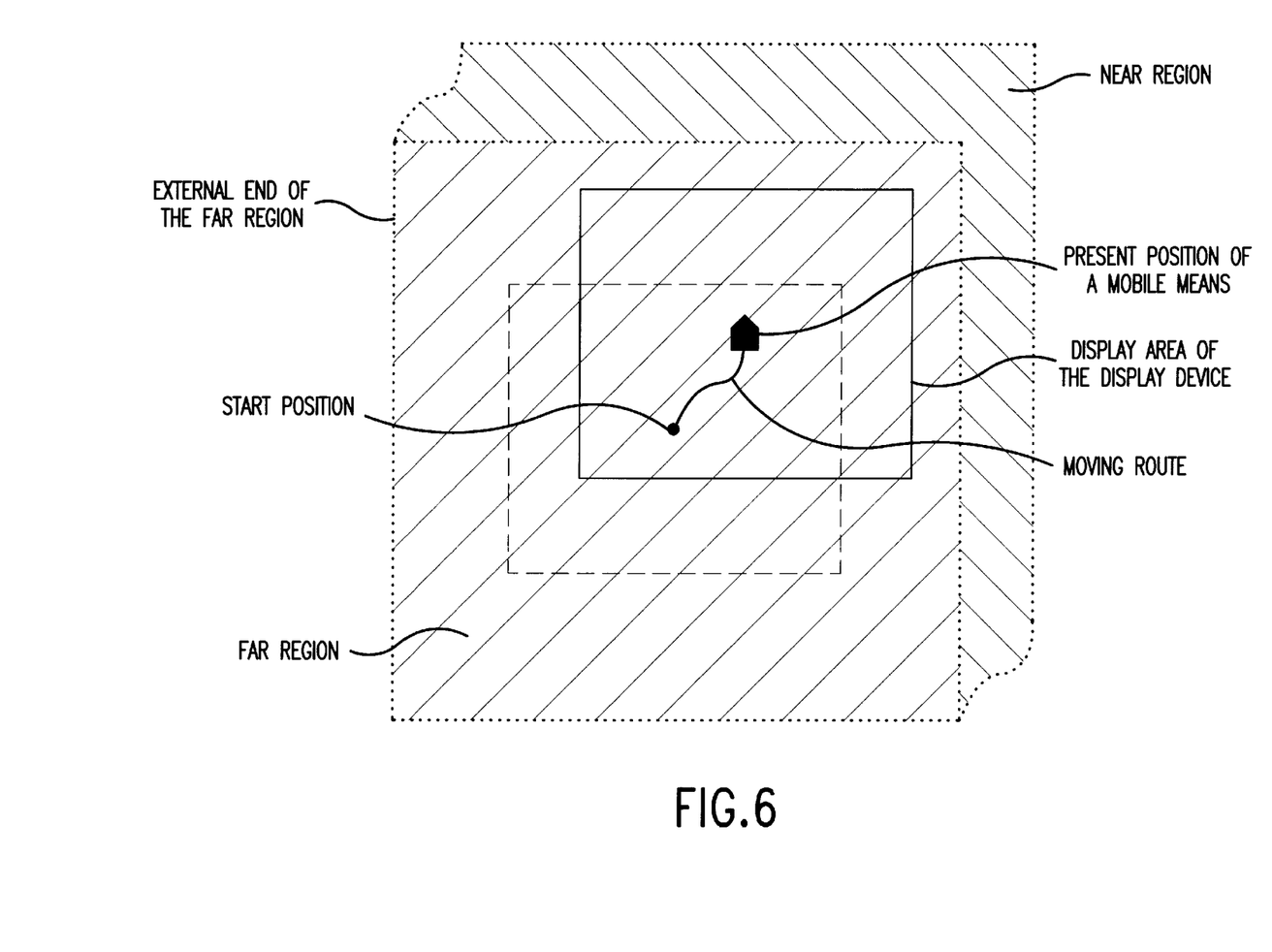
FIG. 6 is a schematic diagram illustrating the far region map information generated when a mobile means moves.

When the mobile means has started the running and the moving distance of the mobile means is determined to be larger than the predetermined distance in the step S14 of FIG. 3, the near region map information is read from the map information supplying device, the far region map information as illustrated in FIG. 6 is generated and the far region map information is stored in the auxiliary memory. In FIG. 6, the black point at the center of FIG. 6 indicates the start position, a thick solid line indicates the locus as the moving route of the mobile means and the black pentagon similar to that of FIG. 5 indicates the present position of the mobile means. The square indicated with the thick solid line indicates the external edge of the display area of the display unit and the map information of the region corresponding to the internal side of the square of thick solid line is displayed in the display area as the display map information. The square of the thick solid line indicates the external edge of the display area of the display unit when the mobile means is located at the start position and corresponds to the square of the thick solid line of FIG. 5.

When the mobile means is located at the start position, the map information of the region indicated at the internal side of the square of thick solid line has been displayed. As explained above, as the mobile means moves, the region of the far region map information to be displayed in the display area is also updated. The region surrounded with the square of the dotted line is identical to the region surrounded with the square of the dotted line of FIG. 5. The region surrounded with the dotted line and hatched with the right-side-down sloping lines indicates the near region and in the step S43 of the subroutine shown in FIG. 4, it also indicates region of the near region map information read from the map information supplying device. The new far region map information can be generated by adding the near region map information read from the map information supplying device to the far region map information stored previously as explained above.

Figure 7:
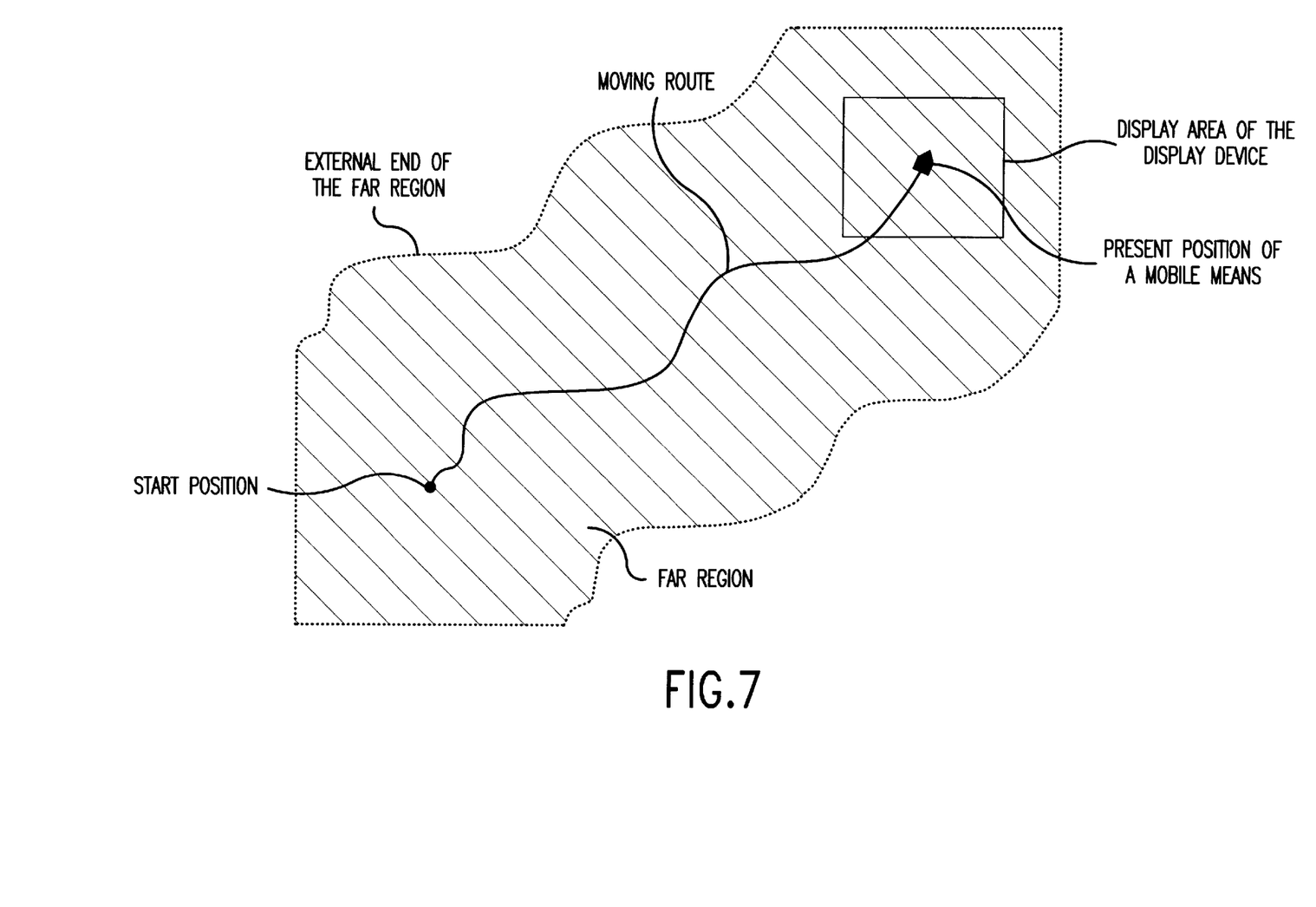
FIG. 7 is a schematic diagram illustrating the far region map information generated as the mobile means moves.

Every time the mobile means continuously moves and the moving distance of the mobile means is determined to be larger than the predetermined distance in the step S14 of FIG. 3, the near region map information newly read this time is added to the far region map information generated previously and thereby the new far region map information can be generated. The far region map information generated as explained above is illustrated in FIG. 7. Like the FIG. 6, the black point indicates the start position, a thick solid line indicates the locus of movement of the mobile means and the black pentagon indicates the present position of the mobile means. In the case of FIG. 7, the map information of the region corresponding to the internal side of the square of thick solid line illustrated at the upper right of the figure is displayed as the display map information in the display area of the display unit. The far region of the far region map information generated as explained above is almost in a strip-like shape.

In the embodiment explained above, the near region is defined in such a manner that it is always provided adjacently to the far region stored in the auxiliary memory, but it is also possible that the near region is defined in the manner that it is partially overlapped with the far region and the far region map information is generated by adjusting the region when the new far region map information is generated.

Figure 8:
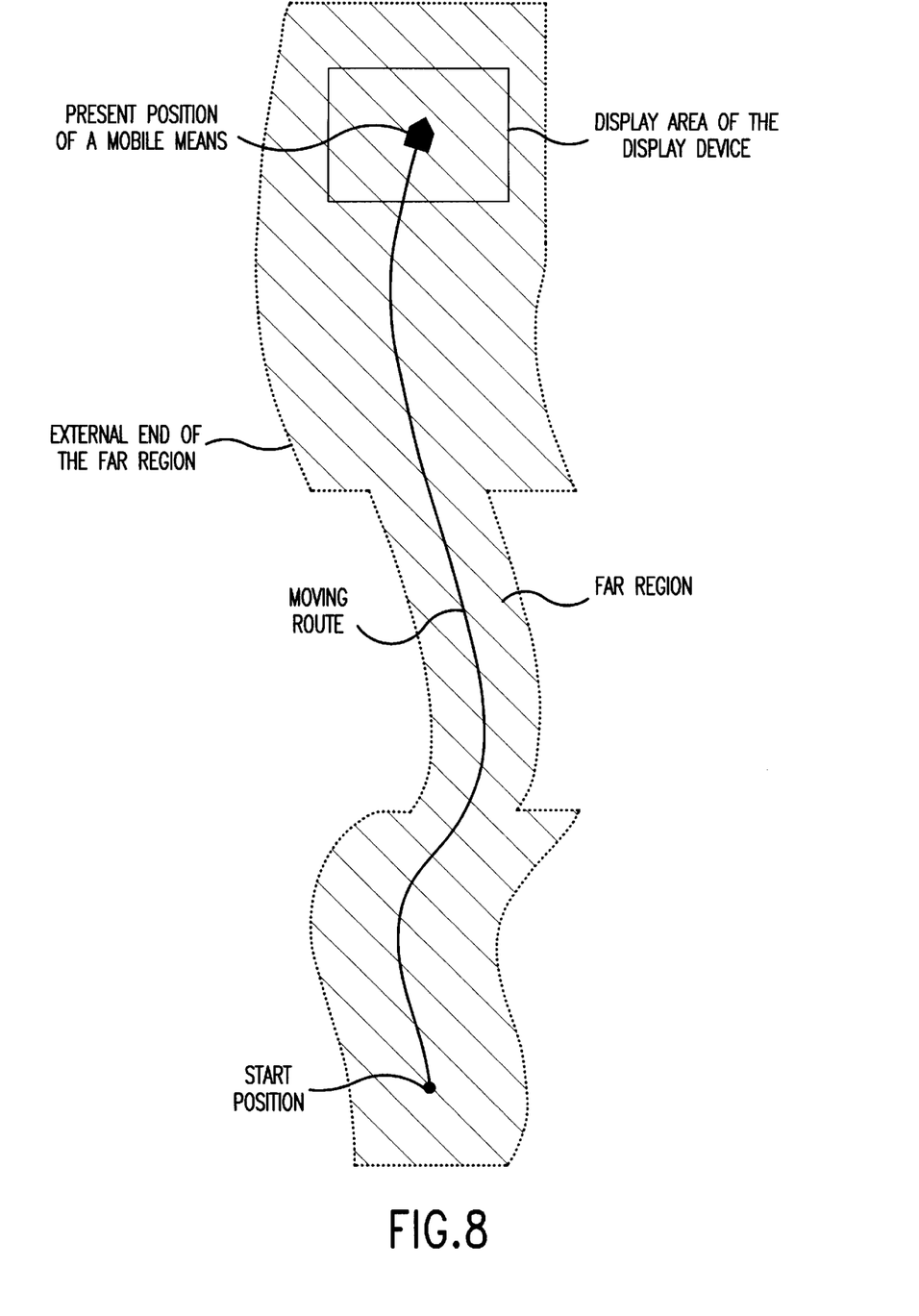
FIG. 8 is a schematic diagram illustrating the far region map information generated when the scale of map information to be displayed is changed.

In above embodiment, the far region map information is generated by defining the scale of map information to be displayed to only one scale but in the case where the scale of map information to be displayed is updated, it is allowed that near region map information depending on the scale is read from the map information supplying device to generate the far region map information. In this case, the map information is read depending on the scale determined when a user has manipulated the "COM" key or "EXP" key of the display input device 60 illustrated in FIG. 2. The far region of the far region map information generated when the scale of map information to be displayed is updated is composed of a plurality of strip-like regions as illustrated in FIG. 8. In FIG. 8, the square of the thick black line indicates the external end of the display area of the display unit. The map information of the region in the internal side of the square of thick black line is displayed in the display area as the display map information. The black pentagon in the figure is a sign indicating the present position of the mobile means. The dotted line indicates the external end of the far region and the map information of the region surrounded with the dotted line is stored in the auxiliary memory as the far region map information. The black point indicates the start position and a thick solid curve indicates the locus of the moving route of the mobile means.

In above embodiment, only the map information of the preset scale is read on the occasion of reading the map information from the map information supplying device, but it is also possible to previously read the map information of the scale which is not yet set.

Figure 9:
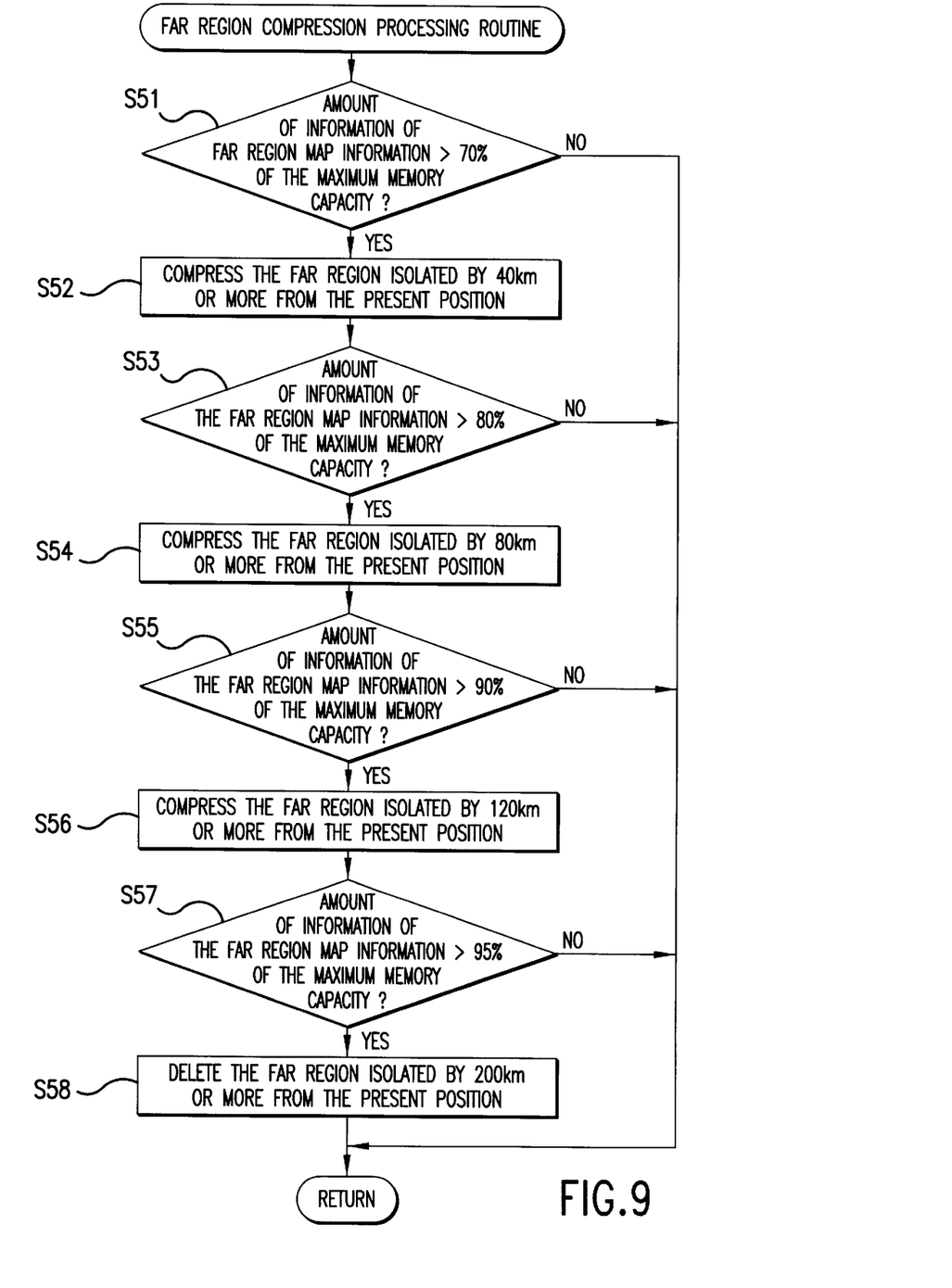
FIG. 9 is a flowchart indicating the subroutine to compress the far region to be called and executed in the step S15 of the subroutine of FIG. 3.

The subroutine for compressing the far region which is called and executed in the step S15 of the subroutine of FIG. 3 explained above is illustrated in FIG. 9. First, it is determined whether the amount of the map information is larger than the predetermined rate of the auxiliary memory, for example, 70% or not (step S51). When the amount of map information is determined to be lower than the predetermined rate of the capacity of auxiliary memory. This subroutine is immediately terminated.

The amount of map information is determined to be larger than the predetermined rate of the capacity of auxiliary memory, the shape of external end of the far region which is isolated, by the predetermined distance, for example, 40 km or longer from the present position of the mobile means along the moving route thereof is set to the strip-like shape wherein the distance up to the external end of the far region from the moving route in the far region is reduced (step S52). In an example of FIG. 10, a black point indicates the start position, a thick solid curve indicates the moving route of the mobile means and a black pentagon indicates the present position of the mobile means. The square of thick solid line indicates the external end of the display area of the display unit and the map information of the region corresponding to the internal side of the square of thick solid line is displayed on the display unit. The region surrounded with a chain line indicates the far region and map information of this far region is stored as the far region map information in the auxiliary memory of mobile navigation system.

Figure 10:
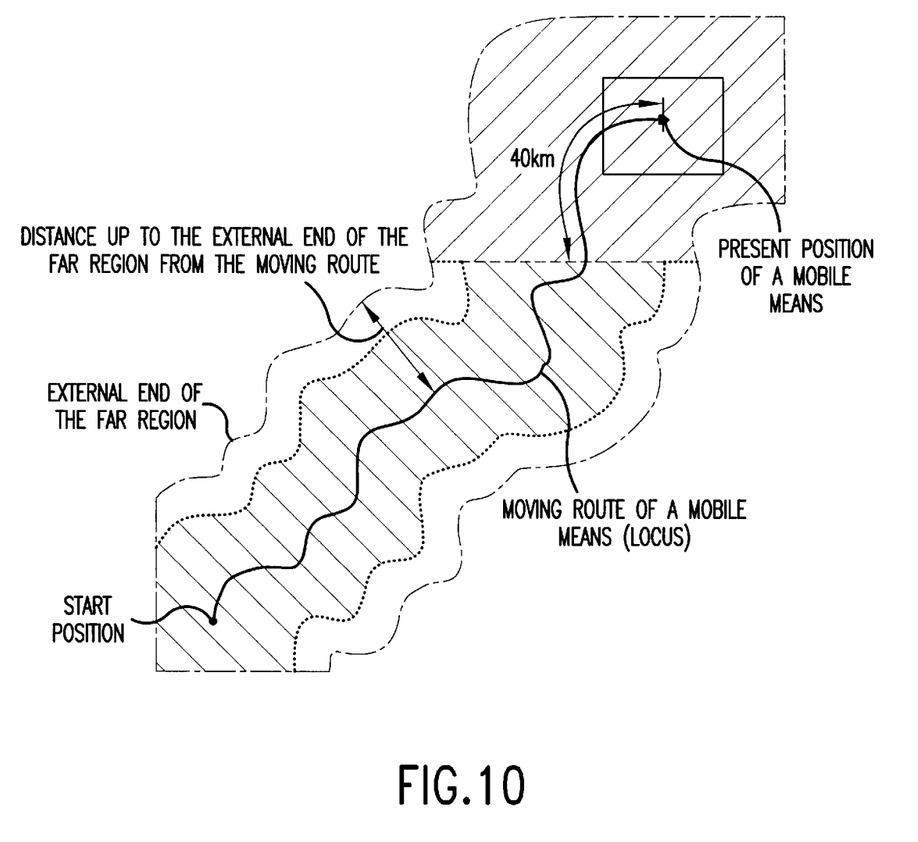
FIG. 10 is a schematic diagram illustrating the far region in such a case that the far region isolated by 40 km or longer from the present position of mobile means along the moving route thereof is set to the strip-like shape wherein the distance up to the external end of far region from the moving route is compressed by only 70%.

In the process of the step S52 explained above, the shape of the far region isolated by 40 km or longer from the present position of the mobile means along the moving route is set to the strip-like shape wherein the distance up to the external end of the far region from the moving route is reduced as illustrated in the region hatched with the right-side-lower oblique lines of FIG. 10. The amount of the far region map information can be reduced by shortening the distance up to the external end of the far region from the moving route of the far region. In the process of step S52 explained above, the distance up to the external end of the far region from the moving route of the far region is reduced only by the predetermined rate, for example, 70%.

Next, it is determined whether the amount of map information is larger than the predetermined rate, for example, 80% of capacity of the auxiliary memory or not (step S53). When the amount of the map information is determined to be less than the predetermined rate of the capacity of the auxiliary memory, this subroutine is immediately terminated. Meanwhile, when the amount of map information is determined to be larger than the predetermined rate of the capacity of the auxiliary memory, the shape of the external end of the far region isolated by the predetermined distance, for example, by 80 km or longer, from the present position of the mobile means along the moving route thereof is set to the strip-like shape where the distance up to the external end of the far region form the moving route in the far region is reduced (step S54).

Figure 11:
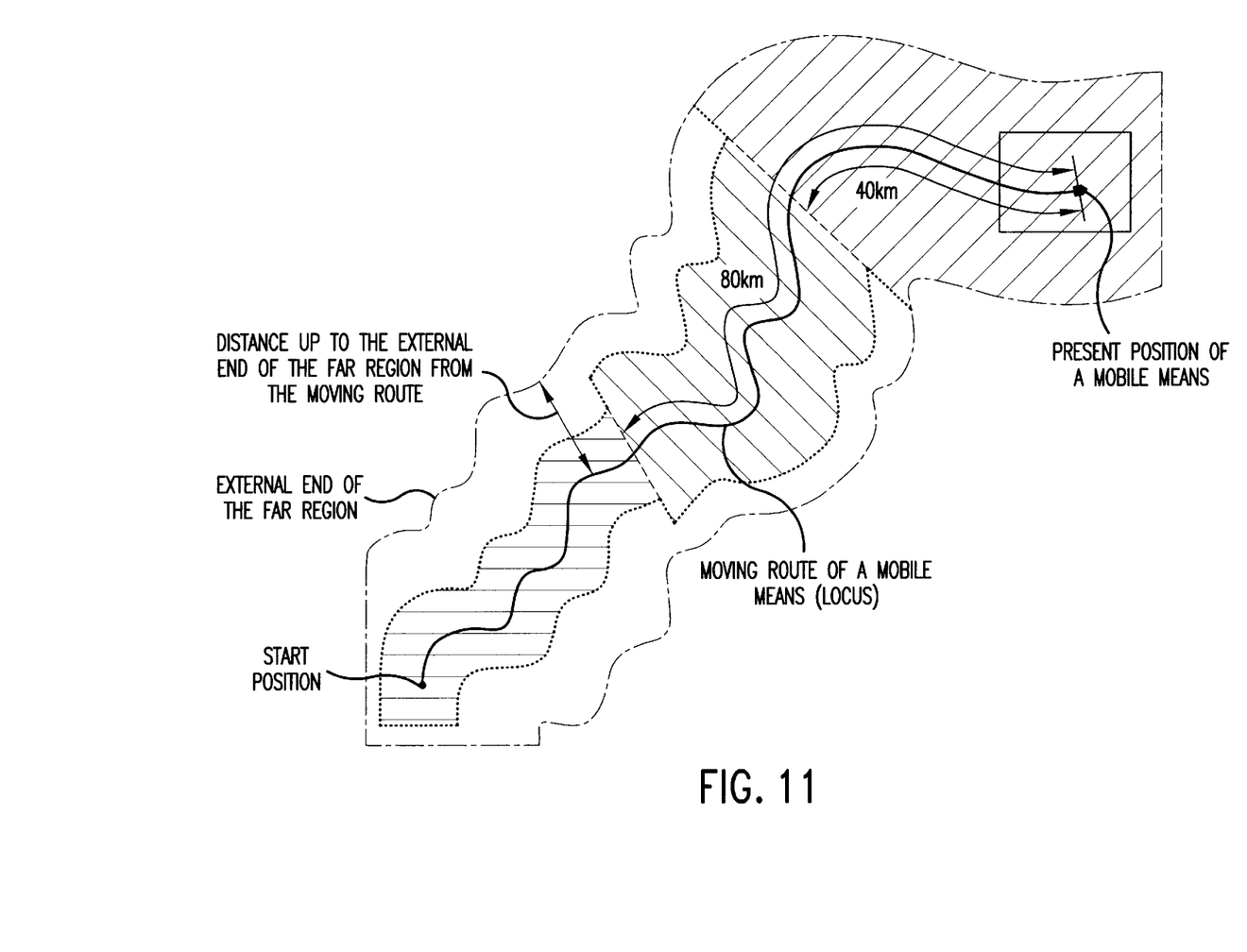
FIG. 11 is a schematic diagram illustrating the far region in such a case that the far region isolated by 80 km or longer from the present position of the mobile means along the moving route thereof is set to the strip-like shape wherein the distance up to the external end of the far region from the moving route is compressed by only 50%.

In an example of FIG. 11, the black point indicates the start position as in the case of an example of FIG. 10, a thick solid curve indicates the moving route of mobile means, a black pentagon indicates the present position of the moving means and the rectangular of a thick solid line indicates the external edge of the display area of the display unit. The display unit displays the map information of the region corresponding to the internal side of the square of a thick solid line. In addition, the region surrounded with a chain line indicates the far region and the map information of this far region is stored as the far region map information in the auxiliary memory of the mobile navigation system. The process in the step S52 explained above sets the shape of the far region isolated in distance by 80 km or longer from the present position of the mobile means along the moving route to the strip-like shape, as indicated in the region of FIG. 11 hatched with the lateral lines, wherein the distance up to the external end of the far region from the moving route is reduced.

The amount of the far region map information can be further reduced by shortening the distance up to the external end of the far region from the moving route of the far region. In the process in the step S54 explained above, the distance up to the external end of the far region from the moving route of the far region is reduced by the predetermined rate, for example, only by 50%.

Next, it is determined that amount of map information is larger than the predetermined rate of the capacity of auxiliary memory, for example, 90% of the capacity or not (step S55). When the amount of map information is determined to be less than the predetermined rate of the capacity of auxiliary memory, this subroutine is immediately terminated.

When the amount of map information is determined to be larger than the predetermined rate of capacity of auxiliary memory, the shape of the external end of far region isolated by the predetermined distance, for example, by 120 km or longer from the present position of the mobile means along the moving route of the mobile means is set to the strip-like shape where the distance up to the external end of the far region from the moving route in the far region is reduced (step S56).

Figure 12:
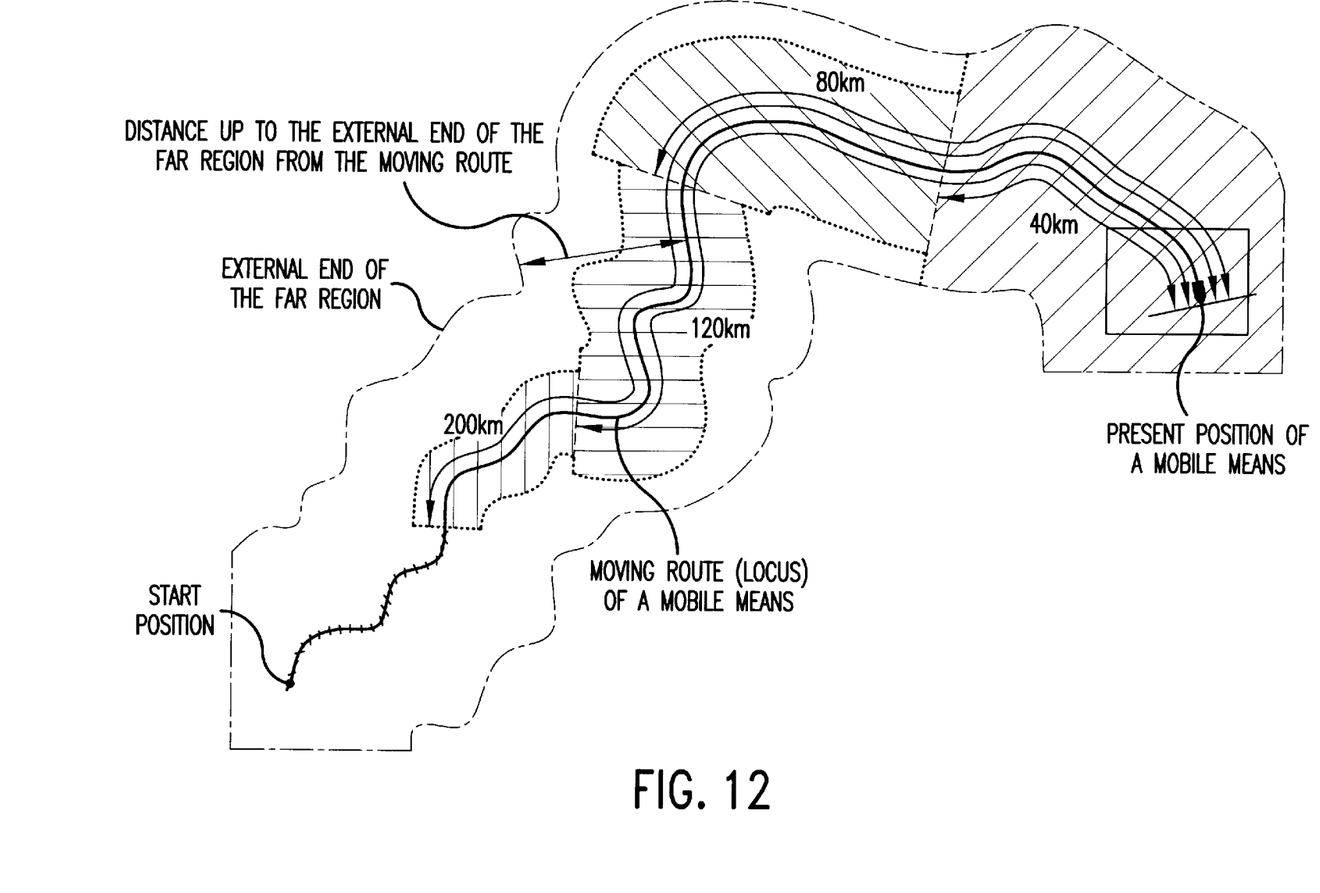
FIG. 12 is a schematic diagram illustrating the far region isolated by 120 km or longer from the present position of the mobile means along the moving route thereof, wherein the distance up to the external end of far region from the moving route is compressed by only 30% and the map information of the far region isolated by 200 km or longer from the present position of mobile means along the moving route thereof is deleted leaving only the road information.

In an example of FIG. 12, a black point indicates the start position as in the case of FIG. 10 and FIG. 11, a thick solid curve indicates the moving route of the mobile means, a black pentagon indicates the present position of the mobile means and the square of a thick solid line indicates the external edge of the display area of the display unit. The map information of the region corresponding to the internal side of the square of thick solid line is displayed on the display unit. The region indicated with a chain line indicates the far region and the map information of this far region is stored as the far region map information in the auxiliary memory of the mobile navigation system.

The process in the step S56 explained above sets, as indicted in the region of FIG. 12 hatched with the lateral lines, the shape of the far region isolated by 120 km or longer from the present position of the mobile means along the moving route to the strip-like shape where the distance up to the external end of the far region from the moving route is reduced.

The amount of the far region map information can further be reduced by shortening the distance up to the external end of far region from the moving route of the far region. In the process in the step S56, the distance up to the external end of far region from the moving route of far region can be reduced by the predetermined rate, for example, by only 30%.

The amount of map information is determined to be larger than the predetermined rate, for example, 95% of the capacity of auxiliary memory or not (step S57). When the amount of map information is determined to be less than the predetermined rate of capacity of the auxiliary memory, this subroutine is immediately terminated.

When the amount of map information is determined to be larger than the predetermined rate of capacity of auxiliary memory, the shape of the external end of far region isolated by the predetermined distance, for example, by 200 km or longer from the present position of the mobile means along the moving route of the mobile means is set to the shape where the distance up to the external end of the far region from the moving route in the far region is reduced to zero (step S58).

For example, as in the case of FIG. 12, the process of step S58 sets the shape of the far region where the distance from the present position of the mobile means along the moving route is isolated by 200 km or longer is set to the shape where the distance up to the external end of the far region from the moving route is reduced to zero. In this case, only the road information is left and the amount of far region information of map information can be reduced to zero.

In the example explained above, on the occasion of compressing the far region, the amount of map information is determined to be larger than the predetermined rate, for example, 70% of capacity of auxiliary memory or not but it is also possible to compress the far region by determining that the leaving amount of memory capacity is less than the predetermined capacity, for example, 3M bytes.

In the step S51 explained above, when the amount of map information is determined to be larger than the predetermined rate, for example, 70% of capacity of auxiliary memory or not, it is possible that the region which cannot be displayed in the display area of the display unit is deleted.

In the embodiment explained above, on the occasion of reducing the far region, the distance up to the external end of far region from the moving route in the far region is shortened for each predetermined rate. However, it is also possible to continuously change the distance up to the external end of far region from the moving route. In this case, the shape of far region is set to the shape where the width of far region becomes narrower as it becomes far from the present position of mobile means.

In the embodiment explained above, the far region is compressed without any confirmation of a user. However, it is also possible that an image for urging a user to confirm the manipulation is displayed before execution of the process to compress the far region and the far region is compressed only when a user has executed the confirming manipulation.

In this specification, the wording "strip-like region" means the longitudinal region along the route and the both end regions of this region can take various shapes, in place of the rectangular shape, such as semicircular shape or semi-elliptical shape.

As explained above, according to the mobile navigation system of the present invention, the desired map information can be stored without any limitation on the capacity of auxiliary memory and the required map information can be displayed quickly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A mobile navigation system comprising:
    present position information generating means for detecting the current position of a mobile means to generate present position information;
    map information storing means for storing map information of a predetermined region;
    map information generating means for reading said map information of said predetermined region from said map information storing means based on said present position information to generate display map information from said map information obtained, said map information generating means including
        near region map information reading means for reading out, from said map information storing means, map information of a near region of the predetermined region indicated with said display map information every time said mobile means moves for only a predetermined distance; and
        far region map information storing means for generating map information in a far region extending along a moving route in which said mobile means has moved from said near region map information and storing such information as readout map information;
    moving distance calculating means for calculating a moving distance of said mobile means based on said present position information; and
    display means for displaying said display map information and said present position information.

2. The mobile navigation system as claimed in claim 1, wherein said near region map information reading means reads out said near region map information depending on a size of a display area of said display means.

3. The mobile navigation system as claimed in claim 1, wherein said far region is in a strip-like shape.

4. The mobile navigation system as claimed in claim 1, wherein said display map information generating means reads said near region map information from said map information storing means via a communication means.

5. The mobile navigation system as claimed in claim 3, wherein said display map information generating means reads said near region map information from said map information storing means via a communication means.

6. The mobile navigation system as claimed in claim 1, wherein said display map information generating means compresses, when the amount of said far region map information is determined larger than a predetermined amount, the distance up to the external end of said far region map information from the route of said mobile means to include the information indicating said route of mobile means depending on the distance from the present position of said mobile means.

7. The mobile navigation system as claimed in claim 1, wherein said mobile means is a vehicle.

8. The mobile navigation system as claimed in claim 1, wherein said present position information generating means includes a global positioning system and a direction sensor.

9. The mobile navigation system as claimed in claim 1, wherein said map information storing means is a map information supplying device.

10. The mobile navigation system as claimed in claim 9, wherein the map information supplying device is a server interconnectable to said mobile navigation system via a communication link.

11. The mobile navigation system as claimed in claim 1, wherein said display map information generating means, said moving distance calculating means, and said near region map information reading means comprise a central processing unit, read-only memory, and random access memory.

12. The mobile navigation system as claimed in claim 11, wherein said display map information generating means further comprises video read only memory.

13. The mobile navigation system as claimed in claim 1, wherein said far region map information storing means includes auxiliary memory.

14. The mobile navigation system as claimed in claim 13, wherein said auxiliary memory comprises an IC card.

15. The mobile navigation system as claimed in claim 13, wherein said auxiliary memory comprises a hard disk drive.

16. The mobile navigation system as claimed in claim 1, wherein said displaying means comprises a display unit.

* * * * *